United States Patent
Miyazawa (10) Patent No.: US 10,419,674 B2
(45) Date of Patent: Sep. 17, 2019

(54) IMAGE BLUR CORRECTION DEVICE, CONTROL METHOD THEREOF, AND IMAGING DEVICE

(71) Applicant: CANON KABUSHIKI KAISHA, Tokyo (JP)

(72) Inventor: Hitoshi Miyazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 15/722,158

(22) Filed: Oct. 2, 2017

(65) Prior Publication Data

US 2018/0103207 A1    Apr. 12, 2018

(30) Foreign Application Priority Data

Oct. 7, 2016 (JP) ................... 2016-198955

(51) Int. Cl.
 G06T 7/20       (2017.01)
 G03B 5/00       (2006.01)
 H04N 5/232      (2006.01)
 G02B 27/64      (2006.01)
 G06K 9/00       (2006.01)

(52) U.S. Cl.
 CPC ....... *H04N 5/23261* (2013.01); *G02B 27/646* (2013.01); *G06K 9/00228* (2013.01); *G06K 9/00261* (2013.01); *H04N 5/2328* (2013.01); *H04N 5/23209* (2013.01); *H04N 5/23219* (2013.01); *H04N 5/23254* (2013.01); *H04N 5/23258* (2013.01); *H04N 5/23287* (2013.01)

(58) Field of Classification Search
 CPC ............. H04N 5/23219; H04N 19/527; H04N 5/23248; H04N 19/139; H04N 5/23287; H04N 5/23254; H04N 19/521; H04N 5/23264; G02B 27/646
 See application file for complete search history.

(56) References Cited

U.S. PATENT DOCUMENTS 5,463,443 A * 10/1995 Tanaka ..................... G03B 5/00
                                                   348/E5.047
2007/0172217 A1* 7/2007 Toji ........................... G03B 5/02
                                                         396/53

(Continued)

FOREIGN PATENT DOCUMENTS

JP    2006-317848 A    11/2006

*Primary Examiner* — Alison Slater
(74) *Attorney, Agent, or Firm* — Cowan, Liebowitz & Latman, P.C.

(57) ABSTRACT

An imaging device detects a shake detection signal and an amount of motion of an image within a photography screen when a panning assist mode is set. A search range of a face detection position of a subject is set, and a process of changing a calculation process of a subject vector is performed based on a face detection result. If the face detection position of the subject is acquired, a first calculation process in which a subject vector is calculated from motion vectors within a first detection range based on the face detection position is performed. If the face detection position of the subject is not acquired and a subject vector can be detected, a second calculation process n which a subject vector is calculated from the motion vectors within a second detection range based on a focus detection frame set within the photography screen is performed.

12 Claims, 7 Drawing Sheets

(56) References Cited

U.S. PATENT DOCUMENTS

| | | | | |
|---|---|---|---|---|
| 2008/0094498 | A1* | 4/2008 | Mori | G03B 5/02 |
| | | | | 348/352 |
| 2008/0107186 | A1* | 5/2008 | Brusnitsyn | H04N 19/139 |
| | | | | 375/240.28 |
| 2008/0199056 | A1* | 8/2008 | Tokuse | G06K 9/00295 |
| | | | | 382/118 |
| 2010/0157080 | A1* | 6/2010 | Kondo | G06T 1/00 |
| | | | | 348/222.1 |
| 2014/0184836 | A1* | 7/2014 | Watanabe | H04N 5/23264 |
| | | | | 348/208.5 |
| 2014/0185938 | A1* | 7/2014 | Tamayama | H04N 19/527 |
| | | | | 382/195 |
| 2015/0085138 | A1* | 3/2015 | Sugaya | H04N 5/23219 |
| | | | | 348/169 |
| 2015/0146023 | A1* | 5/2015 | Takeuchi | G02B 27/646 |
| | | | | 348/208.4 |

* cited by examiner

IMAGE BLUR CORRECTION DEVICE, CONTROL METHOD THEREOF, AND IMAGING DEVICE

BACKGROUND OF THE INVENTION

Field of the Invention

The present invention relates to an image blur correction device, and a control method thereof for correcting image blur that is attributable to camera shake or subject shake.

Description of the Related Art

Panning, which is one of photographing techniques, is photographing a moving subject while a photographer swivels a camera to track motions of the subject, for example, in a horizontal direction, and a long shutter speed in the range of seconds is set to obtain an impression of dynamism in the subject. Panning generally requires skill and experience in photographing, and thus it is deemed as a hard photographing technique for a novice. A first reason therefor is that skillfully photographing a subject while moving a camera to track motions of the subject is difficult. A second reason therefor is that it is hard for a novice to know how long a shutter speed should be set to obtain an impression of dynamism in the subject. As the shutter speed becomes slower, a sense of dynamism increases because an amount of background flow increases. However, camera shake or subject shake easily occurs.

Japanese Patent Laid-Open No. 2006-317848 discloses a method in which a difference between a speed of a subject and a speed of camera movement is detected and a deviation amount corresponding to the difference is corrected using a camera shake correction function to realize panning simply. An angular velocity sensor included in the camera tracking the subject detects an angular velocity of the camera with respect to panning immediately before photographing, and a difference between an angular velocity of the subject and a panning speed of the camera is corrected.

As methods for detecting an amount of movement of a subject image on an image surface, a correlation method based on a correlation operation, block matching, and the like using detection of motion vectors, are known. In block matching, for example, an input image signal is divided into a plurality of block areas each having an appropriate size, and differences from pixels in a certain range of a previous frame are calculated in units of blocks. A block of the previous frame for which the sum of absolute values of the differences has a minimum value is searched for, and a relative deviation between screens indicates a motion vector of the block.

There is a possibility in the technology of the related art that a correct motion vector may be detected or a vector with a low degree of reliability may be detected depending on photographing conditions such as low contrast. In a case of panning with respect to a person, motions of the hands and feet are irregular, and thus motion vectors with a low degree of reliability may be detected. If motion vectors of the entire body of a person including his or her hands and feet are used, an angular velocity of a subject to be calculated may be erroneously calculated, and instead there may be a tendency for over-correction and thus subject shake may be significant.

SUMMARY OF THE INVENTION

The present invention increases the reliability of panning of a subject person, or the like. A device according to an embodiment of the present invention is an image blur correction device that corrects image blur using a correction unit, which has a calculation unit that calculates an amount of motion of a subject by acquiring a shake detection signal of an imaging device or a lens device and an amount of motion of an image within a photography screen and acquiring a face detection position of the subject, and calculates angular velocity data indicating movement of the subject with respect to the imaging device when a specific mode is set; and a control unit that controls the correction unit based on the calculated angular velocity data. The calculation unit performs a first calculation process in which the amount of motion of the subject is calculated in a first detection range from the face detection position if the face detection position is acquired and a second calculation process in which the amount of motion of the subject is calculated in a second detection range from a position of a focus detection frame set within the photography screen if the face detection position is not acquired.

Further features of the present invention will become apparent from the following description of exemplary embodiments (with reference to the attached drawings).

DESCRIPTION OF THE EMBODIMENTS

An exemplary embodiment of the present invention will be described below in detail with reference to the accompanying drawings. The present invention is applicable to imaging devices equipped with image blur correction devices, such as compact digital cameras, video cameras, surveillance cameras, web cameras, and the like. In the present specification, a method of reducing a difference between a subject movement speed and a panning speed (or a tilting speed) using movement of a movable optical member as a technology that supports panning of a user will be referred to as panning assistance. A mode in which panning assistance is set to support panning of the user will be referred to as a panning assist mode. Note that, although the mode in which the method for reducing a difference between a subject movement speed and a panning speed (or a tilting speed) using movement of a movable optical member is executed will be referred to as the panning assist mode in the present specification, any mode is possible as long as the method is implemented therein.

Figure 1:
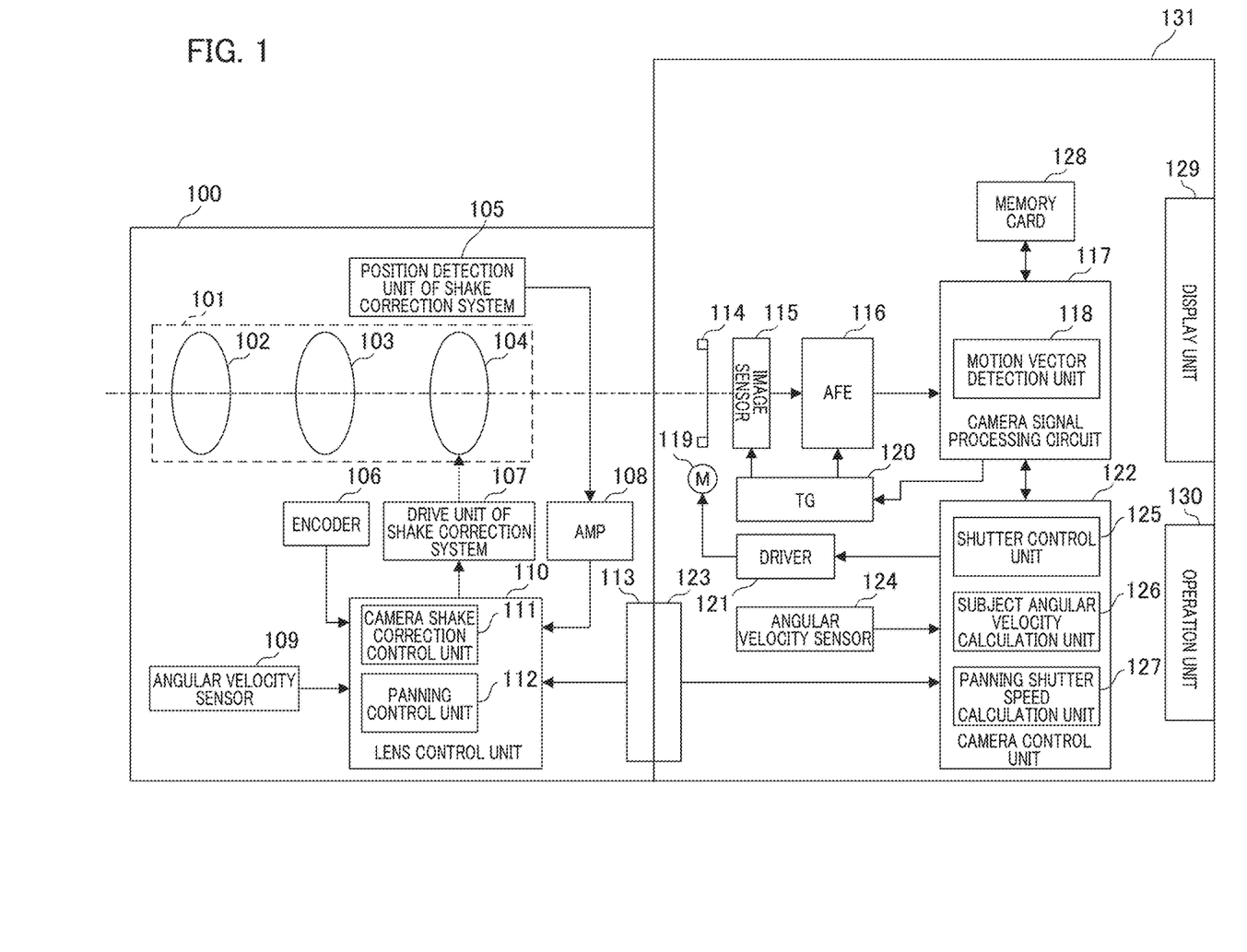
FIG. 1 is an overall configuration diagram of an imaging device according to an embodiment of the present invention.

FIG. 1 is a block diagram showing an example of a configuration of an imaging device according to an embodiment of the present invention. Although an example of an imaging system in which a lens device (an interchangeable lens 100) can be mounted on a camera body part 131 will be described in the present embodiment, the present invention can also be applied to an imaging device in which a lens unit is integrated with a camera body part.

The interchangeable lens 100 includes a photographing lens unit 101. The photographing lens unit 101 includes a main imaging optical system 102, a zoom lens group 103 that can change a focal length, and a shift lens group 104. The shift lens group 104 is a movable optical member that corrects shake of an image with respect to an optical axis caused by shaking of the imaging device and optically corrects image blur caused when it moves in a direction perpendicular to the optical axis of the photographing lens unit 101. A zoom encoder 106 detects a position of the zoom lens group (which will also be referred to as a zoom lens) 103. A position detection unit 105 detects a position of the shift lens group (which will also be referred to as a shift lens) 104.

The interchangeable lens 100 includes an angular velocity sensor 109. The angular velocity sensor 109 is an example of a detection unit that detects shake and outputs a shake detection signal. A shake detection signal (an angular velocity detection signal) from the angular velocity sensor 109 is acquired by a lens control unit 110 for signal processing. The lens control unit 110 includes a micro-computer for lens system control and controls each unit included in the interchangeable lens 100. A drive unit 107 for correcting image blur drives the shift lens 104 complying with a control command from the lens control unit 110. An amplifying circuit 108 amplifies an output of the position detection unit 105 and outputs a position detection signal to the lens control unit 110. The interchangeable lens 100 includes a mounting contact part 113 for the camera body part 131.

The lens control unit 110 includes a camera shake correction control unit 111 that controls correction of camera shake and a panning control unit 112 that controls the panning assist mode. FIG. 1 expresses internal processes of the lens control unit 110 with the functional blocks of the control units 111 and 112. Although the lens control unit 110 also performs control of focus adjustment through driving of the focus lens, control of an aperture, and the like, this control is omitted for the sake of simplicity of illustration. In addition, in actual correction of camera shake, for example, detection of shake and correction of image blur are performed with respect to two axes that are orthogonal to each other in a vertical direction and a horizontal direction with respect to an attitude of the camera. Since the detection of shake and correction of image blur with respect to the two axes are configured to be the same as each other except for the difference in the detection directions, description will be provided only for one axis below. The imaging device according to the present embodiment includes an image blur correction device that employs optical correction of image blur to correct image blur by driving a movable optical member in a direction different from the optical axis direction (e.g., a direction orthogonal thereto).

The camera body part 131 includes a shutter 114 that adjusts an exposure time and an image sensor 115 such as a complementary metal oxide semiconductor (CMOS) sensor. An analog signal processing circuit (analog front-end or AFE) 116 processes an output of the image sensor 115 and outputs the processed result to a camera signal processing circuit 117. The camera signal processing circuit 117 includes a motion vector detection unit 118 that detects a motion of an image. The motion vector detection unit 118 acquires image signals of different photographing times output from the image sensor 115 and detects a motion of a subject or a background within an angle of view. The camera body part 131 includes a timing generator (TG) 120, and sets operation timings of the image sensor 115 and the analog signal processing circuit 116. An operation unit 130 of the camera body part 131 includes a power switch, a release switch, and the like.

The camera body part 131 includes a camera control unit 122. The camera control unit 122 includes a micro-computer that controls the entire camera system to perform control of various kinds by reading a predetermined program from a memory and executing the program. The camera control unit 122 includes a shutter control unit 125, a subject angular velocity calculation unit 126 that calculates an angular velocity of a main subject, and a panning shutter speed calculation unit 127. FIG. 1 expresses internal processes of the camera control unit 122 with functional blocks. A driver 121 drives a shutter driving motor 119 complying with a control command of the camera control unit 122. A memory card 128 is a recording medium on which captured video data is recorded. A display unit 129 includes, for example, a liquid crystal panel (or an LCD) to enable images being photographed to be monitored and a photographed image to be displayed on a screen. The camera body part 131 includes a mounting contact part 123 for the interchangeable lens 100. The lens control unit 110 and the camera control unit 122 perform serial communication via the mounting contact parts 113 and 123 at a predetermined timing.

An overview of an operation of the imaging device of FIG. 1 will be described. When a user mounts the interchangeable lens 100 on the camera body part 131 and turns the power of the imaging device on using the operation unit 130, the camera control unit 122 detects a change of state. The camera control unit 122 performs supply of power to circuits of the camera body part 131 and initial setting thereof. In addition, power is supplied to the interchangeable lens 100, and the lens control unit 110 performs an initial setting of the interchangeable lens 100. Then, communication between the lens control unit 110 and the camera control unit 122 starts at a predetermined timing. For example, information such as a state, a photographing setting, and the like of the imaging device is transmitted from the camera control unit 122 to the lens control unit 110 through this communication. In addition, focal length information of the interchangeable lens 100, angular velocity information, and the like are transmitted from the lens control unit 110 to the camera control unit 122.

If the panning assist mode has not been selected through a user operation using the operation unit 130, a camera shake correction operation is performed. That is, the angular velocity sensor 109 detects shake exerted on the camera due to camera shake or the like in the interchangeable lens 100. The camera shake correction control unit 111 acquires a shake detection signal and corrects the camera shake by controlling driving of the shift lens 104. The shake correction function of the imaging device will be described below.

Figure 2:
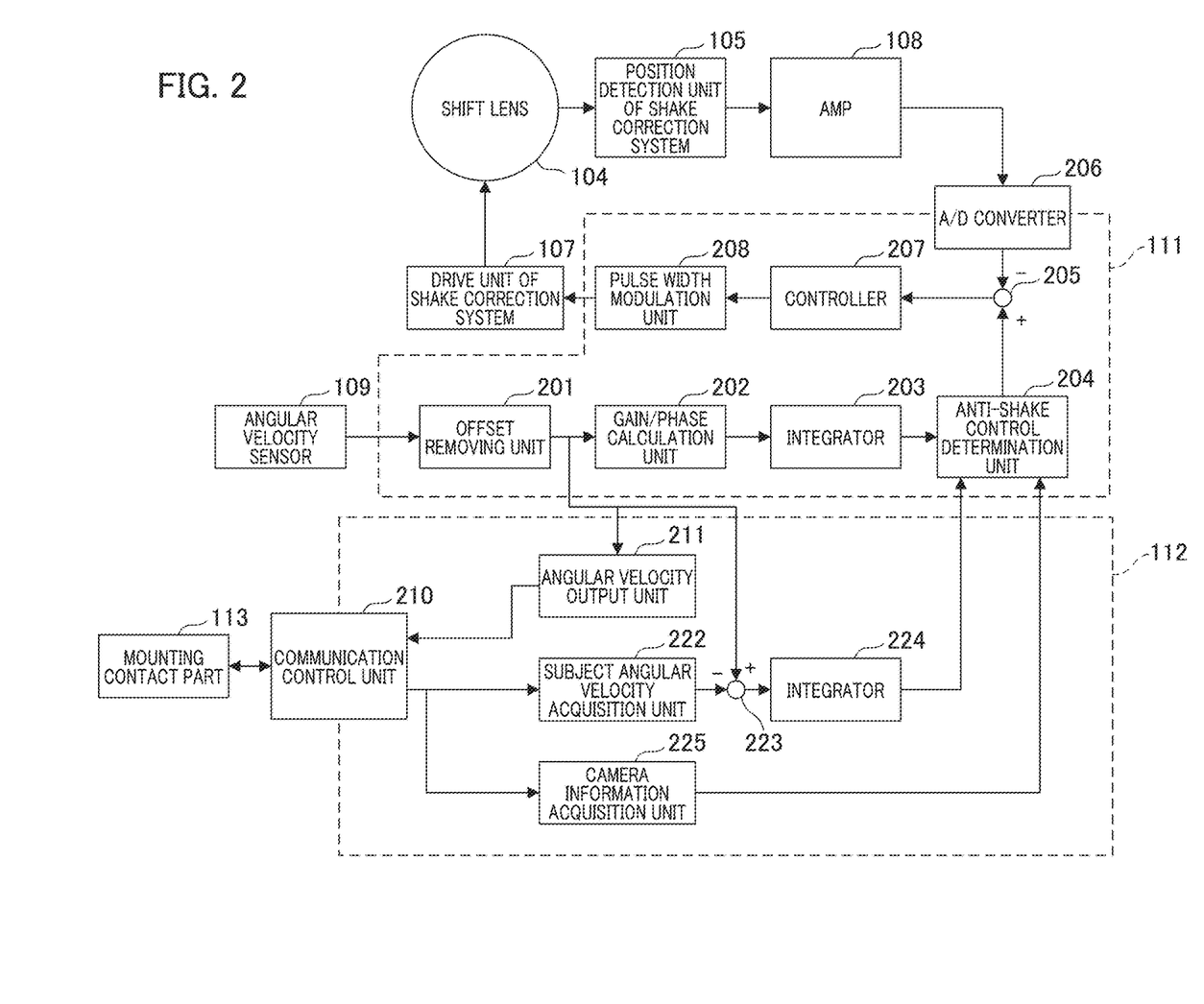
FIG. 2 is a control block diagram of a blur correction system according to the embodiment of the present invention.

FIG. 2 is a diagram of a configuration with regard to a shake correction operation. Constituent elements shared by FIG. 1 are given the same reference numerals and description thereof will be omitted. Units 201 to 208 of FIG. 2 indicate specific constituent elements of the camera shake correction control unit 111. An offset removing unit 201 is a filter operation unit configured with, for example, a high-pass filter. The offset removing unit 201 removes DC components included in an output of the angular velocity sensor 109. A gain/phase calculation unit 202 is configured with an amplifier that amplifies angular velocity data from which DC components have been removed by the offset removing unit 201 with a predetermined gain and a phase compensating filter. An integrator 203 has a function of changing its characteristics in an arbitrary frequency band. The integrator 203 integrates an output of the gain/phase calculation unit 202 and calculates a driving amount of the shift lens 104.

An anti-shake (image blur correction) control determination unit 204 switches a control signal for driving the shift lens 104 in accordance with an output of a camera information acquisition unit 225. If the panning assist mode is set, the anti-shake control determination unit 204 employs an output of an integrator 224 calculated by the panning control unit 112. In addition, if a mode other than the panning assist mode is set, the anti-shake control determination unit 204 employs an output of the integrator 203 calculated by the camera shake correction control unit 111.

An output of the shift lens 104 to the position detection unit 105 is amplified by the amplifying circuit 108 and converted into digital data by an A/D converter 206. This digital data is transmitted to a subtractor 205 as a negative input. The subtractor 205 acquires an output of the anti-shake control determination unit 204 as a positive input, subtracts the digital data from the A/D converter 206 from the output, and outputs the subtraction result (deviation data) to a controller 207. The controller 207 includes an amplifier that amplifies input data with a predetermined gain and a phase compensating filter. The controller 207 performs signal processing on the deviation data that is the output of the subtractor 205 using the amplifier and the phase compensating filter, and then outputs the result to a pulse width modulation (PWM) unit 208. The pulse width modulation unit 208 performs modulation to a PWM waveform for changing a duty ratio of a pulse wave based on the output data of the controller 207 and supplies the result to the drive unit 107 of the shake correction system. The drive unit 107 is a voice coil-type motor that drives the shift lens 104, and moves the shift lens 104 in the direction perpendicular to the optical axis in accordance with the output of the pulse width modulation unit 208.

Next, the panning control unit 112 will be described. If a user performs an operation to set the panning assist mode with the operation unit 130, the camera control unit 122 switches to control of panning assistance. Setting information of the panning assist mode is transmitted from the camera control unit 122 to the lens control unit 110, and the lens control unit 110 transitions to control of the panning assist mode. The camera information acquisition unit 225 has acquired the setting information and release information of the panning assist mode. An angular velocity output unit 211 acquires an output of the offset removing unit 201, and outputs angular velocity data of the angular velocity sensor 109 included in the interchangeable lens 100 to the camera control unit 122. A subject angular velocity acquisition unit 222 acquires angular velocity data of a main subject calculated by the subject angular velocity calculation unit 126 included in the camera body part 131 to be described blow. This angular velocity data is acquired via the mounting contact part 113 and a communication control unit 210. A subtractor 223 performs subtraction by receiving an output of the offset removing unit 201 as a positive input and an output of the subject angular velocity acquisition unit 222 as a negative input. That is, the subtractor 223 calculates a difference between the angular velocity data detected in the interchangeable lens 100 and the angular velocity data of the main subject detected in the camera body part 131, and outputs the difference (deviation data) to an integrator 224. The integrator 224 integrates the deviation data and outputs the integrated data to the anti-shake control determination unit 204.

Here, a method for calculating the angular velocity of the main subject will be described. In the camera body part 131 set to be in the panning assist mode, the motion vector detection unit 118 included in the camera signal processing circuit 117 detects and outputs motion vectors of a main subject from information of a captured video. At the same time, the camera control unit 122 receives angular velocity data detected by the angular velocity sensor 109 included in the interchangeable lens 100 from the lens control unit 110.

Figure 3:
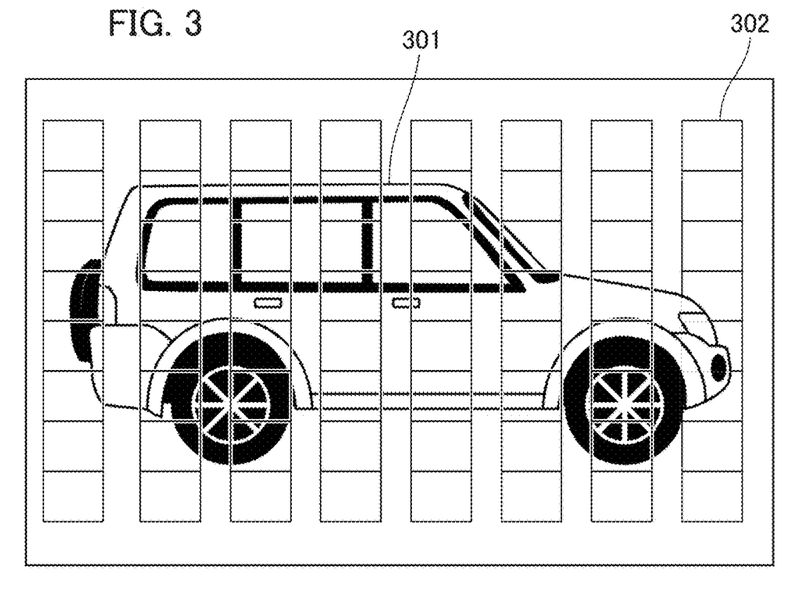
FIG. 3 is a diagram for describing detection of motion vectors at the time of panning.

Two types of vector that are of the main subject that a photographer tries to capture and of a flowing background are obtained as motion vectors output from the motion vector detection unit 118 for panning. Since panning is the goal in this case, a vector of the main subject from the detected two types of motion vector is employed. The method of employing a vector of the main subject will be described using FIGS. 3 and 4. FIG. 3 illustrates an example of an image of a scene photographed in panning. In this example, motion vector detection blocks 302 are arrayed in 8 rows and 8 columns in the screen. Amounts of motion of the image of one previous frame and the image of a current frame are detected in each of the detection blocks, and a vector of a subject 301 and a vector of a background are detected.

Figure 4:
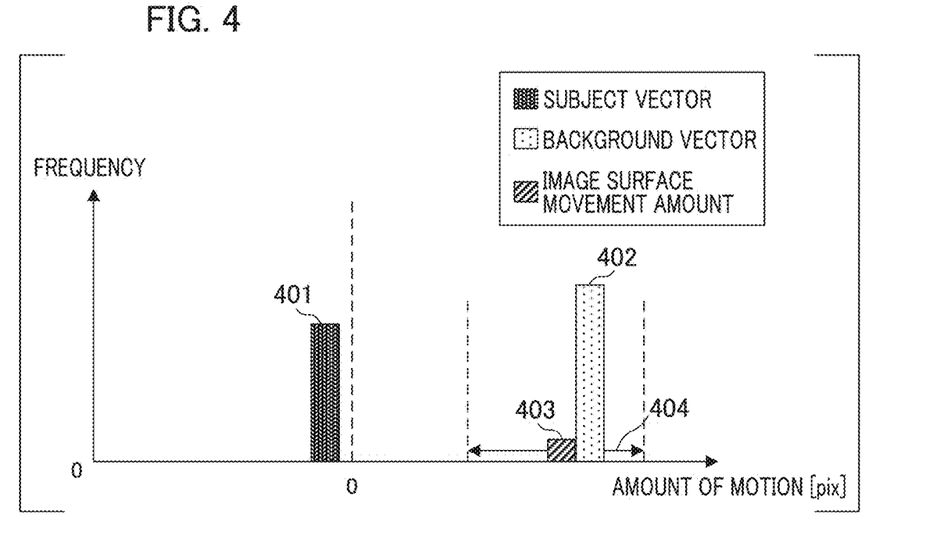
FIG. 4 is a diagram showing detection of a subject vector at the time of panning.

FIG. 4 is a graph displaying motion vectors detected by the motion vector detection unit 118 using a histogram. The horizontal axis represents amount of motion (unit: pixels) and the vertical axis represents the number of times (frequency). In the present embodiment, angular velocity data that is an output of the angular velocity sensor 109 is used in order to accurately distinguish between a subject vector and a background vector. If a photographer can capture and track a subject well using the imaging device, the subject vector is around 0 pixels. However, the amount of motion of the subject increases if the photographer is more inexperienced in photographing, and the subject vector moves away from 0 pixels, and then it is hard to distinguish between the subject vector and a background vector. Thus, in the present embodiment, the angular velocity data that is the output of the angular velocity sensor 109 is converted into an image surface movement amount 403. Data of a focal length or a frame rate of the imaging optical system is used in the conversion process. A vector group present in a certain range (background range) 404 of values of the image surface movement amount 403 is determined to be a background vector 402. In addition, a vector group present outside of the certain range 404 is determined to be a subject vector 401. Note that, if there are a plurality of subjects within a photography screen, there are assumed to be a plurality of subject vectors. In this case, a subject vector that is closest to a focus frame (see a focus detection frame 602 of FIG. 5) of the camera is employed. The reason for this is that the photographer puts the focus frame on the main subject that he or she wants to photograph regardless of panning. The value of the subject vector determined in this way is determined as an amount of movement of the main subject on the image surface. Note that angular velocity data used for the histogram in the present embodiment may be angular velocity data that is an output of an angular velocity sensor 124 included in the camera body part 131.

Figure 5:
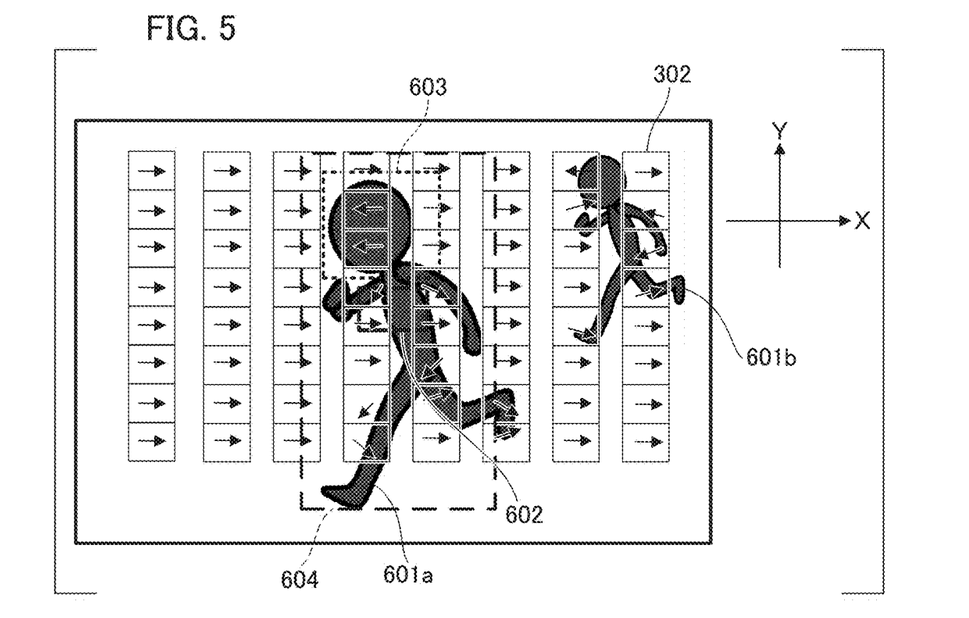
FIG. 5 is a diagram for describing a process during panning of persons according to the embodiment of the present invention.

Motion vector processing during panning of persons will be described with reference to FIG. 5. FIG. 5 illustrates an example of a panning image of persons in which their whole bodies are included in an angle of view. The horizontal direction of FIG. 5 is set to an X direction and the vertical direction is set to a Y direction. With regard to the detection blocks 302 for motion vectors, the positive (right) direction in the X direction from the upper left corner that is a reference position is assumed to be a direction of increase for columns, and the negative (downward) direction in the Y direction is assumed to be a direction of increase for rows. A subject 601a and another subject 601b are present in the angle of view, and both are persons. The subject 601a is in front of the subject 601b (or is closer to the camera). The photographer is assumed to set the subject 601a as a main subject and put a focus detection frame 602 on the subject 601a (e.g., in the case of one-point AF frame).

In the present embodiment, a face detection search range (which will also be referred to simply as a search range) 604 is set in a certain range from the center position of the focus detection frame 602. The camera control unit 122 performs a face detection process for a subject (a person, an animal, or the like) in the search range 604 and changes a subject vector addition method based on the face detection result. In panning of a person, motions of the hands and feet of the subject 601a are irregular motions, and thus a detected motion vector is highly likely to be a vector with low reliability as a result. On the other hand, since a face and body are making stable motions, motion vectors with high reliability can be detected. Therefore, in the present embodiment, the face is detected as a part whose motion vector can be detected with high reliability in the panning of a person, and the subject vectors of the parts surrounding the face image are used.

A specific example of the search range 604 will be described using FIG. 5. The search range 604 is set as a rectangular range in which the Y direction is the long-side direction and the X direction is the short-side direction with the center position of the focus detection frame 602 as the origin. For example, the search range 604 may be set to be a focus detection range of 80% of the angle of view in the Y direction and 40% of the angle of view in the X direction. Note that, if the photographer is gripping the camera in the vertical direction (a vertically holding state), the search range is set with the Y direction as the short-side direction and the X direction as the long-side direction. Detection information generated by an acceleration sensor included in the camera body part 131, which is not illustrated, is used in the determination of an attitude of the camera. An axis of influence due to the direction of gravity among three axes (an X axis, a Y axis, and a Z axis) of the acceleration sensor can be determined. For example, if the photographer is performing photographing in a horizontally holding state of the camera, the camera is influenced by gravity in the Y axis direction, and thus a state in which an output of the acceleration sensor on the Y axis is different from outputs thereof on the X and Z axes is determined to be the horizontally holding state.

The camera control unit 122 uses the focus detection frame 602 to set the search range 604. That is, if the plurality of the subjects 601a and 601b are present in the angle of view, the photographer puts the focus detection frame 602 only on the subject 601a that is the main subject making motions in images that he or she wants to stop. Thus, a motion vector of the subject 601a on which the focus detection frame 602 has been put, rather than the subject 601b, can be detected.

Next, an addition method for subject vectors will be described. A case in which a face detection position 603 is in the search range 604 of FIG. 5 is assumed. In this case, the detection block that is closest to the face detection position 603 is one in the 3rd row and 4th column. With this detection block serving as the origin block, the detection blocks positioned on the sides above, below, to the left and to the right of this block, which are ones in the 2nd row and 4th column (above), the 4th row and the 4th column (below), the 3rd row and the 3rd column (left), and the 3rd row and the 5th column (right), are addition targets. That is, the detection blocks adjacent to the origin block in the four orthogonal directions thereof are selected. However, detection blocks having values of motion vectors in the range of a predetermined threshold from the motion vector value of the origin block (the one in the 3rd row and the 4th column) are addition targets. That is, the values of the motion vectors of the detection blocks can be added if the values are in the range of a threshold value (e.g., 3 pixels) ±the motion vector of the origin block (the one in the 3rd row and the 4th column). The reason for this is to prevent erroneous calculation of the subject vector. In the detection block in the 3rd row and the 3rd column positioned to the left of the origin block and the detection block in the 3rd row and the 5th column positioned to the right of the origin block, for example, the face region does not overlap the detection block if the face of the subject 601a is small, and then it is highly likely that an amount of motion of the background will be added. In such a case, if the values of the motion vectors of the detection blocks are not within a range of a predetermined threshold value from the value of the motion vector of the origin block, the detection blocks are excluded from the addition targets.

In addition, in a case of photographing conditions such as low contrast, there is a possibility of a motion vector of a detection block with a low reliability being erroneously detected. Thus, in the present embodiment, this detection block is not included in the addition targets of the subject vectors. Further, if the number of detection blocks corresponding to the face region of the subject is much smaller than the total number of detection blocks, a first threshold value (e.g., 1) for determining a subject vector may be set to be smaller than a second threshold value (e.g., 4) set for a subject other than a person.

Figure 6:
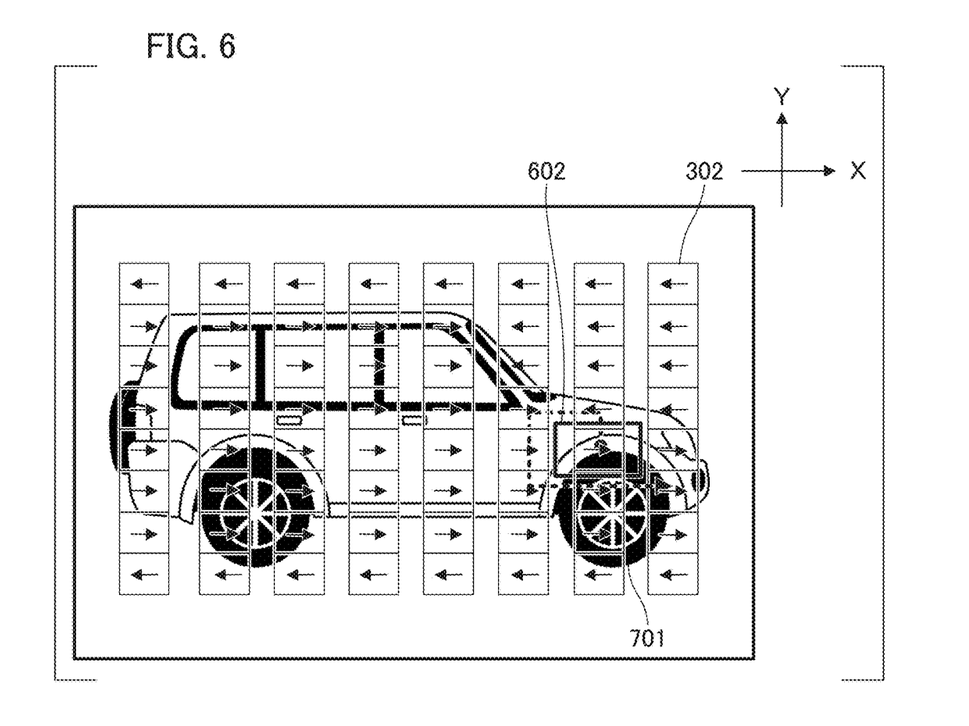
FIG. 6 is a diagram for describing a process during panning of a subject other than persons according to the embodiment of the present invention.

Panning of a moving body (a vehicle) other than persons will be described with reference to FIG. 6. The horizontal direction of FIG. 6 is set to the X direction and the vertical direction thereof is set to the Y direction. In panning of a moving body (a vehicle), a motion of a subject 701 is a stable motion in a certain direction. The subject 701 overlaps a number of detection blocks 302, and thus a number of subject vectors can be detected. Thus, a detection block (one in the 5th row and the 7th column) close to the position of the focus detection frame 602 on which a focus is put is selected as an origin block. Searching for and addition in detection blocks are performed in a circle shape (a concentric circle shape) around the origin block. However, there is a possibility of a detection block indicating a result of a motion vector with low reliability being present at the time of low contrast. In this case, the detection result of this detection block is not included in the addition targets of the subject vectors in order to lower the likelihood of erroneous detection of motion vectors.

As described above, the main subject vector (motion vector) intended by the user can be calculated by combining the result of face detection and the search range 604 in the present embodiment. Even if there are the plurality of subjects 601a and 601b within the photography screen (see FIG. 5), for example, the main subject vector can be calculated from the vectors around the face image of the subject 601a making motions that the photographer wants to stop in the image. The calculated main subject vector can be used to calculate an angular velocity of the subject in the reverse sequence to the case in which the angular velocity data is converted into an image surface movement amount.

Figure 7:
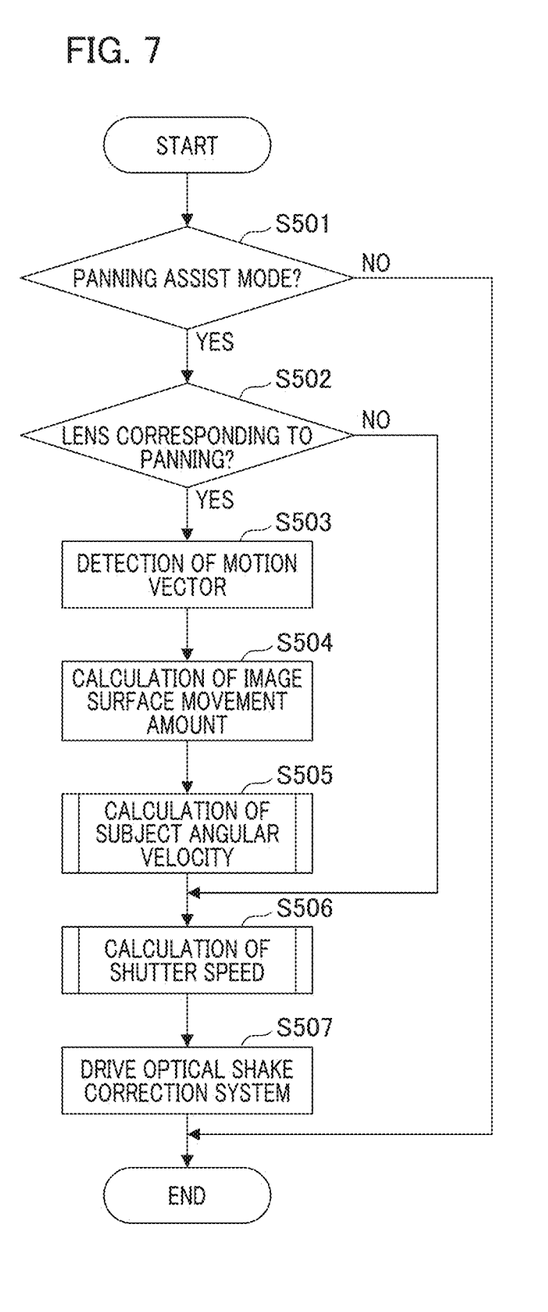
FIG. 7 is a flowchart describing a process performed during panning according to the embodiment of the present invention.
Figure 8:
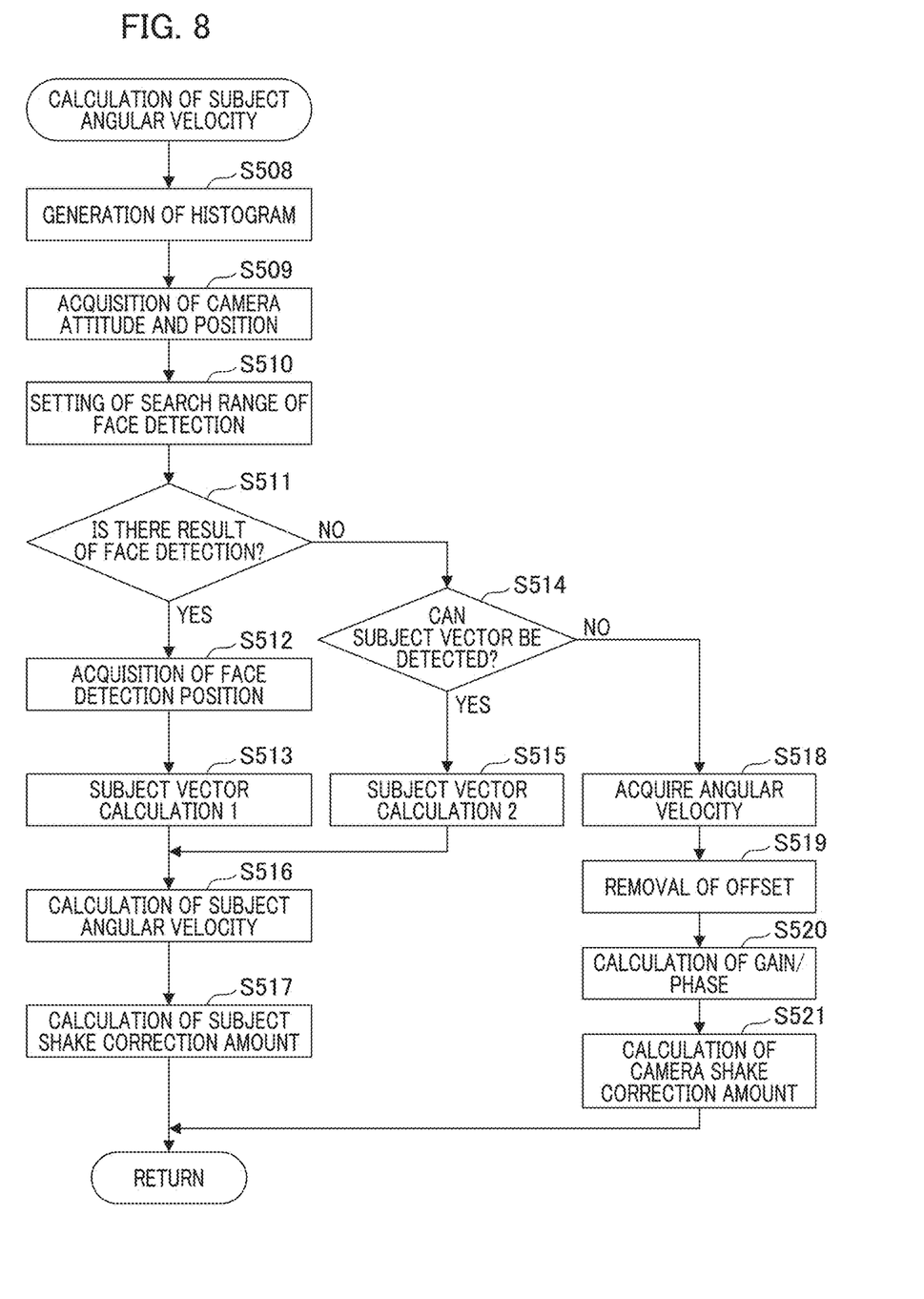
FIG. 8 is a flowchart of a subject angular velocity calculation process according to the embodiment of the present invention.
Figure 9:
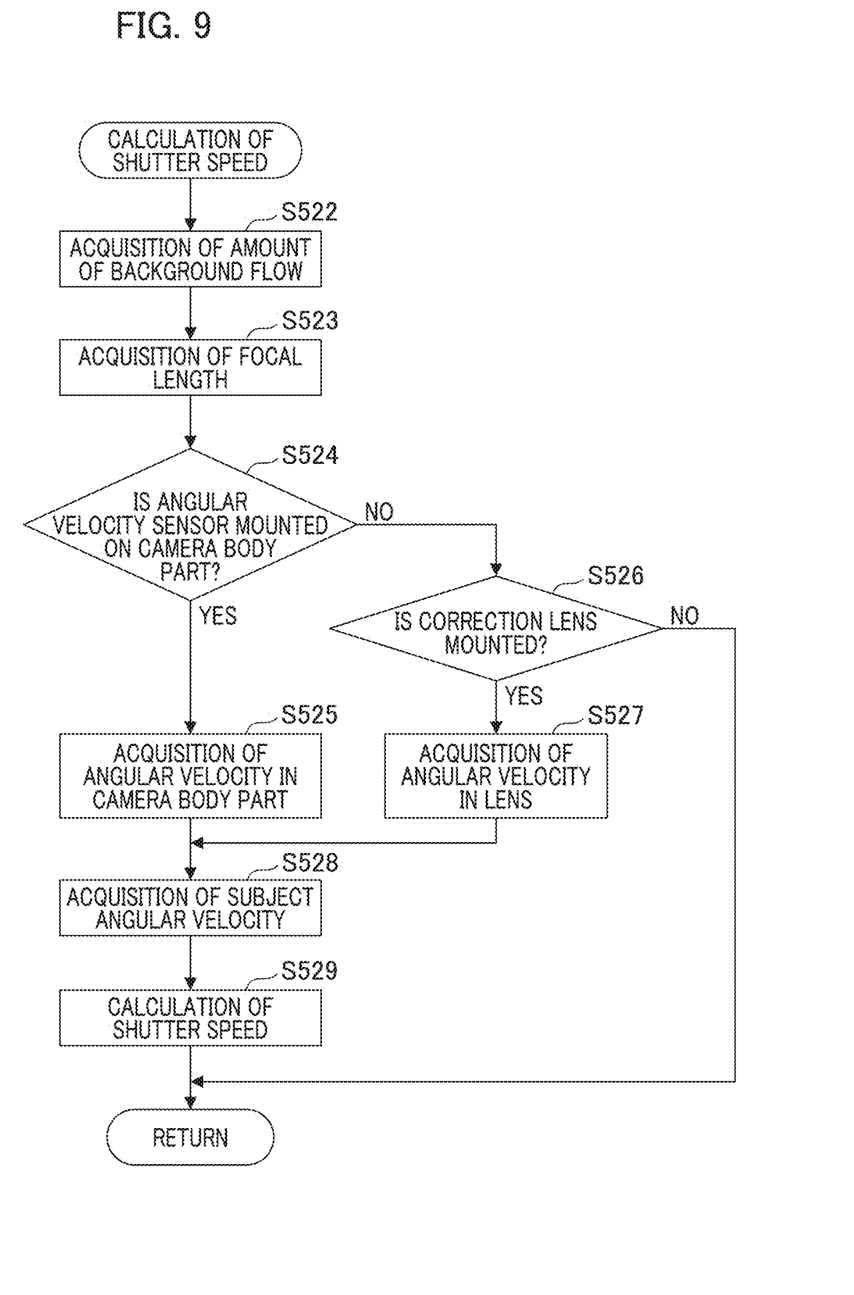
FIG. 9 is a flowchart of a shutter speed calculation process according to the embodiment of the present invention.

FIGS. 7 to 9 are flowcharts describing a process performed when the panning assist mode is set in the present embodiment. The following process is realized when each CPU of the camera control unit 122 and the lens control unit 110 reads a program from a memory and executes the program.

First, the process of FIG. 7 will be described.

(S501) Mode Determination Process

The camera control unit 122 determines whether the photographer has performed an operation of setting the panning assist mode with the operation unit 130. If the panning assist mode is set, this process proceeds to S502, and if a mode other than the panning assist mode is set, the process ends without control of setting the panning assist mode.

(S502) Lens Determination Process

The camera control unit 122 determines whether the interchangeable lens 100 mounted on the camera body part 131 is an interchangeable lens that is applicable to the panning assist mode. If the lens is an interchangeable lens that is applicable to the panning assist mode, the process proceeds to S503, and if it is not the interchangeable lens that is applicable to the panning assist mode, the process proceeds to S506. Note that determination of whether the interchangeable lens 100 corresponds to the panning assist mode is performed using a signal transmitted from the lens control unit 110 to the camera control unit 122.

(S503) Motion Vector Detection Process

The motion vector detection unit 118 detects amounts of motions of an image within the photography screen as motion vectors, and outputs the detection results to the camera control unit 122.

(S504) Image Surface Movement Amount Calculation Process

The camera control unit 122 calculates an amount of movement on an image surface using angular velocity data from the angular velocity sensor 109 included in the interchangeable lens 100, a focal length of the imaging optical system, and data of a frame rate (see FIG. 4).

(S505) Subject Angular Velocity Calculation Process

The subject angular velocity calculation unit 126 calculates an angular velocity of a subject. Details of this calculation process will be described in S508 to S521 of FIG. 8.

(S506) Shutter Speed Calculation Process

The panning shutter speed calculation unit 127 calculates a shutter speed for panning assistance. Details of this calculation process will be described in S522 to S529 of FIG. 9.

(S507) Shift Lens Drive Control

The camera control unit 122 determines an amount of driving of the shift lens 104 driven during an exposure period of the image sensor 115 using the angular velocity of the subject calculated in S505 and the shutter speed for assisting panning calculated in S506. The lens control unit 110 acquires the determined amount of driving and controls driving of the shift lens 104.

Next, the subject angular velocity calculation process (S505) of FIG. 7 will be described with reference to FIG. 8.

(S508) Histogram Generation Process

The subject angular velocity calculation unit 126 performs an arithmetic operation with regard to generation of a histogram for all of the motion vectors detected in S503.

(S509) Acquisition of Attitude and Position of Camera

The subject angular velocity calculation unit 126 acquires detection information of an attitude and a position of the camera. In a camera attitude determination process, an axis of influence due to the direction of gravity is detected from outputs of the three axes (the x, y, and z axes) of the acceleration sensor provided in the camera body part 131. It is possible to determine in what direction the user is gripping the camera based on the outputs of the acceleration sensor.

(S510) Setting of Search Range

The subject angular velocity calculation unit 126 sets the search range 604 from the center position of the focus detection frame 602 in accordance with the attitude and the position of the camera acquired in S509.

(S511) Determination of Face Detection

The subject angular velocity calculation unit 126 determines whether there is a result of face detection within the search range 604 set in S510. If there is the result of face detection within the search range 604, the process proceeds to S512, and if there is no result of face detection within the search range 604, the process proceeds to S514.

(S512) Acquisition of Face Detection Position

Since the result of face detection is present within the search range 604, the subject angular velocity calculation unit 126 acquires the position of the face detection of the subject person in the angle of view to calculate an angular velocity of the subject using the motion vectors of blocks around the face detection block.

(S513) Calculation of Subject Vector 1 (First Calculation Process)

The subject angular velocity calculation unit 126 sets detection blocks (a detection range) around the detection block at the face detection position acquired in S512 or the detection block that is closest to the position on the upper, lower, left, and right sides (four orthogonal directions) as addition targets. However, if the motion vectors in the detection range are within a range of a predetermined threshold value (e.g., ±3 pixels) from the motion vector of the detection block that is closest to the face detection position, subject vectors are calculated as addition targets. Note that the number of vectors that are addition targets (a first cumulative number) is set as A1.

(S514) Determination of Whether Subject Vector can be Detected

The subject angular velocity calculation unit 126 determines whether a subject vector can be detected. If a subject vector is determined to be detectable, the process proceeds to S515, and if no subject vector can be detected, the process proceeds to S518. Here, with respect to a criterion for determining detection of the subject vector, the subject vector is determined to be detectable if a frequency thereof shown in FIG. 4 is greater than or equal to a predetermined threshold value (e.g., a frequency of 4). If the frequency of the subject vector is lower than the predetermined threshold value, the subject vector is determined not to be detectable.

(S515) Calculation of Subject Vector 2 (Second Calculation Process)

The subject angular velocity calculation unit 126 calculates a subject vector by adding up the motion vectors of the detection blocks (detection range) in a concentric circle around the detection block that is closest to the focus detection frame 602. Note that the number of motion vectors to be added (a second cumulative number) is set as A2, and A2 is set to be greater than A1 of S513.

(S516) Calculation of Subject Angular Velocity

The subject angular velocity calculation unit 126 calculates a subject angular velocity using the subject vector calculated in S513 or S515. The subject vector is converted into a subject angular velocity in the reverse sequence to the case in which the angular velocity data that is the output of the angular velocity sensor 109 is converted into the amount of movement on the image surface using the focal distance of the imaging optical system and the data of the frame rate in S504.

(S517) Calculation of Subject Shake Correction Amount

The subtractor 223 calculates the difference between the subject angular velocity data transmitted from the camera control unit 122 to the lens control unit 110 and the angular velocity data of the angular velocity sensor 109 included in the interchangeable lens 100 (an output of the offset removing unit 201). The calculated differences are integrated by the integrator 224. Accordingly, a target control value of the shake correction control (an amount of subject shake correction) is calculated.

(S518) Acquisition of angular velocity

In a case when no subject vector has been detected in S514, the lens control unit 110 switches the control of the shift lens 104 to camera shake correction control. A process of acquiring angular velocity data that is an output of the angular velocity sensor 109 included in the interchangeable lens 100 is performed.

(S519) Removal of Offset

The offset removing unit 201 has a high-pass filter, and has a function of changing its characteristics in an arbitrary frequency band. DC components mixed into the angular velocity data are removed by blocking low frequency components included in the angular velocity data and outputting a high frequency band signal.

(S520) Calculation of Gain and Phase

The amplifier of the gain/phase calculation unit 202 amplifies the angular velocity data from which an offset is removed in S519 with a predetermined gain and the phase compensating filter thereof performs signal processing.

(S521) Calculation of Camera Shake Correction Amount

The angular velocity data that has undergone the signal processing in S520 is integrated by the integrator 203, and thus a target control value of camera shake correction control (an amount of camera shake correction) is calculated. S517 or S521 transitions to a return process thereafter.

Next, the shutter speed calculation process (S506) of FIG. 7 will be described with reference to FIG. 9.

(S522) Acquisition of Background Flow Amount

The panning shutter speed calculation unit 127 acquires a value of an amount of background flow set by the photographer with the operation unit 130.

(S523) Acquisition of Focal Length

The camera control unit 122 acquires focal length data transmitted from the lens control unit 110 included in the interchangeable lens 100 via the mounting contact parts 113 and 123.

(S524) Determination of Presence of Angular Velocity Sensor in Camera Body Part.

Whether the angular velocity sensor 124 is mounted on the camera body part 131 is determined. If the angular velocity sensor 124 is mounted on the camera body part 131, the process proceeds to S525, and if the angular velocity sensor 124 is not mounted on the camera body part 131, the process proceeds to S526.

(S525) Acquisition of Angular Velocity in Camera Body Part

Angular velocity data is acquired by the angular velocity sensor 124 in the camera body part 131. Then, the process proceeds to S528.

(S526) Determination of Mounting of Correction Lens

The camera control unit 122 determines whether the shift lens 104 is mounted in the interchangeable lens 100 using information acquired from the lens control unit 110. If the shift lens 104, which is an image blur correction lens, is mounted in the interchangeable lens 100, the process proceeds to S527. If the shift lens 104 is not mounted in the interchangeable lens 100, an angular velocity sensor is determined to be mounted in neither the interchangeable lens 100 nor the camera body part 131, and the process transitions to a return process.

(S527) Acquisition of Angular Velocity in Interchangeable Lens

The fact that the shift lens 104 is mounted in the interchangeable lens 100 indicates that the angular velocity sensor 109 is mounted in the interchangeable lens 100. In this case, angular velocity data is acquired by the angular velocity sensor 109. Then, the process proceeds to S528.

(S528) Acquisition of Subject Angular Velocity

Angular velocity data of the subject calculated in S516 is acquired. Note that a subject angular velocity acquired when no subject vector is detected in S514 is 0 degrees per second (dps).

(S529) Calculation of Shutter Speed

The panning shutter speed calculation unit 127 calculates a shutter speed for assisting panning based on formula (1) using each piece of the data acquired in S522 to S528.

$$TV = \alpha / f(\omega g - \omega s) \tag{1}$$

In formula (1), TV represents a shutter speed, $\alpha$ represents a coefficient of a background flowing effect, f represents a focal length, $\omega g$ represents a camera angular velocity, and $\omega s$ represents a main subject angular velocity.

S529 transitions to the return process thereafter. Note that, if the shift lens 104 is determined not to be mounted in the interchangeable lens 100 in S526, a background angular velocity may be calculated using a background vector from the histogram in S508, and a shutter speed for assisting panning may be calculated using the calculated value. Alternatively, a value (e.g., 1/60 seconds) programmed by the panning shutter speed calculation unit 127 in advance may be set for the shutter speed.

The angular velocity data received from the interchangeable lens 100 corresponds to a camera panning speed. Thus, if the difference between the received angular velocity data and the angular velocity data calculated using the amount of movement of the main subject on the image surface and a current focal length of the imaging optical system is calculated, the result is angular velocity data indicating movement of the main subject with respect to the camera. The camera control unit 122 transmits the calculated angular velocity data of the main subject to the lens control unit 110. The lens control unit 110 calculates an amount of driving of the shift lens 104 in accordance with setting data of the camera and performs shake correction control.

According to the present embodiment, it is possible to raise a success rate of panning of a subject person or the like by combining a face detection position of the subject and a result of calculation of a subject vector in panning assistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-198955, filed Oct. 7, 2016, which is hereby incorporated by reference wherein in its entirety.

What is claimed is:

1. An image blur correction device that corrects image blur using a correction unit which corrects image blur by driving a movable optical member, the image blur correction device comprising:
at least one processor that functions, according to at least one program stored in a memory, as units comprising:
a calculation unit configured to calculate an amount of motion of a subject by acquiring a shake detection signal of an imaging device or a lens device and an amount of motion of an image within a photography screen and acquiring a face detection position of the subject and to calculate angular velocity data indicating movement of the subject with respect to the imaging device when a specific mode is set; and
a control unit configured to control the correction unit based on the calculated angular velocity data,
wherein the calculation unit performs a first calculation process in which the amount of motion of the subject is calculated in a first detection range from the face detection position if the face detection position is acquired and a second calculation process in which the amount of motion of the subject is calculated in a second detection range from a position of a focus detection frame set within the photography screen if the face detection position is not acquired.

2. The image blur correction device according to claim 1, wherein the calculation unit acquires detection information of an attitude of the imaging device and sets a search range relating to the face detection position.

3. The image blur correction device according to claim 1, wherein the amount of motion of the image is motion vectors acquired from image signals of different photographing times, and
wherein the calculation unit calculates the amount of motion of the subject by adding motion vectors included in the first detection range in the first calculation process.

4. The image blur correction device according to claim 3, wherein the calculation unit calculates motion vectors of the subject by a first cumulative number in the first calculation process, and the calculation unit calculates motion vectors of the subject by a second cumulative number that is greater than the first cumulative number in the second calculation process.

5. The image blur correction device according to claim 4, wherein the calculation unit calculates a motion vector of the subject as an addition target if a value of the motion vector in the first detection range is a motion vector of the face detection position or is within a threshold value from a value of the motion vector at a position that is closest to the face detection position in the first calculation process.

6. The image blur correction device according to claim 3, wherein a direction in which the calculation unit adds the motion vectors in the first calculation process is different from a direction in which the calculation unit adds the motion vectors in the second calculation process.

7. The image blur correction device according to claim 6, wherein the calculation unit adds the motion vectors of positions adjacent to the face detection position in four orthogonal directions in the first calculation process, and adds the notion vectors in a circular detection range around a position of the focus detection frame in the second calculation process.

8. The image blur correction device according to claim 1, wherein the specific mode is a mode that supports panning.

9. An image device comprising:
an image sensor;
an image blur correction device that corrects image blur using a correction unit which corrects image blur by driving a movable optical member;
at least one processor that functions, according to at least one program stored in a memory, as units comprising:
a calculation unit configured to calculate an amount of motion of a subject by acquiring a shake detection signal of the imaging device or a lens device and an amount of motion of an image within a photography screen and acquiring a face detection position of the subject and to calculate angular velocity data indicating movement of the subject with respect to the imaging device when a specific anode is set; and
a control unit configured to control the correction unit based on the calculated angular velocity data, and
wherein the calculation unit performs a first calculation process in which the amount of motion of the subject is calculated in a first detection range from the face detection position if the face detection position is acquired and a second calculation process in which the amount of motion of the subject is calculated in a second detection range from a position of a focus detection frame set within the photography screen if the face detection position not acquired.

10. The imaging device according to claim 9, further the processor functions as units comprising:
a detection unit configured to detect, an angular velocity of shaking of the imaging device;
a shutter speed calculation unit configured to calculate a shutter speed using data of the angular velocity detected by the detection unit and data of an angular velocity of the subject if the specific mode is set; and
a shutter control unit configured to control a shutter based on the calculated shutter speed.

11. The imaging device according to claim 9,
wherein a lens device can be mounted on a body part of the imaging device,
further the processor functions as units comprising:
a shutter speed calculation unit configured to calculate a shutter speed using data of the angular velocity detected by the detection unit provided in the lens device and data of an angular velocity of the subject if the specific mode is set; and
a shutter control unit configured to control a shutter based on the calculated shutter speed.

12. A control method executed by an image blur correction device that corrects image blur using a correction unit which corrects image blur by driving a movable optical member, the control method comprising:
calculating an amount of motion of a subject by acquiring a shake detection signal of an imaging device or a lens device and an amount of motion of an image within a photography screen and acquiring a face detection position of the subject, and calculating angular velocity data indicating movement of the subject with respect to the imaging device when a specific mode is set; and
controlling the correction unit based on the calculated angular velocity data,
wherein, in the calculating, a first calculation process in which the amount of motion of the subject is calculated in a first detection range from the face detection position if the face detection position is acquired and a second calculation process in which the amount of motion of the subject is calculated in a second detection range from a position of a focus detection fame set within the photography screen if the face detection position is not acquired is included.

* * * * *